US010820311B2

(12) United States Patent
Yang et al.

(10) Patent No.: US 10,820,311 B2
(45) Date of Patent: Oct. 27, 2020

(54) RESOURCE ALLOCATION AND VRB-TO-PRB MAPPING IN MOBILE COMMUNICATIONS

(71) Applicant: MediaTek Singapore Pte. Ltd., Singapore (SG)

(72) Inventors: Weidong Yang, San Diego, CA (US); Tzu-Han Chou, San Jose, CA (US)

(73) Assignee: MEDIATEK SINGAPORE PTE. LTD., Singapore (SG)

(*) Notice: Subject to any disclaimer, the term of this patent is extended or adjusted under 35 U.S.C. 154(b) by 31 days.

(21) Appl. No.: 16/243,080

(22) Filed: Jan. 9, 2019

(65) Prior Publication Data

US 2019/0215809 A1 Jul. 11, 2019

Related U.S. Application Data

(60) Provisional application No. 62/615,406, filed on Jan. 9, 2018, provisional application No. 62/616,034, filed (Continued)

(51) Int. Cl.
*H04W 72/04* (2009.01)
*H04L 5/00* (2006.01)
(Continued)

(52) U.S. Cl.
CPC ........ *H04W 72/042* (2013.01); *H04B 7/0413* (2013.01); *H04L 5/0026* (2013.01);
(Continued)

(58) Field of Classification Search
CPC ...... H04W 72/04; H04W 88/08; H04W 76/00
See application file for complete search history.

(56) References Cited

U.S. PATENT DOCUMENTS

2007/0109956 A1* 5/2007 Kwon ............... H04L 1/1812
370/208
2009/0268624 A1* 10/2009 Imamura ............... H04W 48/08
370/252
(Continued)

FOREIGN PATENT DOCUMENTS

CN 103326839 A 9/2013
CN 107370580 A 11/2017

OTHER PUBLICATIONS

China National Intellectual Property Administration, International Search Report and Written Opinion for International Patent Application No. PCT/CN2019/071020, dated Apr. 12, 2019.
(Continued)

*Primary Examiner* — Hassan A Phillips
*Assistant Examiner* — Prenell P Jones
(74) *Attorney, Agent, or Firm* — Han IP PLLC; Andy M. Han

(57) ABSTRACT

Various examples with respect to resource allocation and VRB-to-PRB mapping in mobile communications are described. A processor of a user equipment (UE) establishes a multiple-input multiple-output (MIMO) wireless communication link with a network node of a wireless network. The processor receives data from the network node, with the data represented by a plurality of resource block groups (RBGs) in a frequency domain in terms of resource allocation. The processor then processes the data. In receiving the data, the processor receives in one or more precoding resource block groups (PRGs) of a plurality of PRGs in the frequency domain via the MIMO wireless communication link. The plurality of RBGs and the plurality of PRGs are aligned in the frequency domain.

20 Claims, 7 Drawing Sheets

Related U.S. Application Data on Jan. 11, 2018, provisional application No. 62/617,150, filed on Jan. 12, 2018, provisional application No. 62/619,077, filed on Jan. 18, 2018, provisional application No. 62/620,405, filed on Jan. 22, 2018.

(51) Int. Cl.
  *H04L 25/02* (2006.01)
  *H04B 7/0413* (2017.01)
(52) U.S. Cl.
  CPC .......... *H04L 5/0051* (2013.01); *H04L 5/0094* (2013.01); *H04L 25/02* (2013.01); *H04L 25/0204* (2013.01)

(56) References Cited

U.S. PATENT DOCUMENTS

| | | | |
|---|---|---|---|
| 2011/0206147 A1* | 8/2011 | Hariharan | H04L 1/08 375/260 |
| 2014/0211732 A1* | 7/2014 | Nogami | H04L 5/0053 370/329 |
| 2014/0211739 A1* | 7/2014 | Kim | H04L 5/0053 370/329 |
| 2014/0286288 A1* | 9/2014 | Park | H04L 5/0053 370/329 |
| 2015/0063231 A1* | 3/2015 | Seo | H04L 5/0044 370/329 |
| 2015/0117350 A1* | 4/2015 | Seo | H04L 5/0048 370/329 |
| 2016/0227520 A1 | 8/2016 | Davydov et al. | |
| 2017/0223686 A1* | 8/2017 | You | H04L 5/0048 |
| 2019/0150118 A1* | 5/2019 | Nam | H04L 5/0094 370/329 |

OTHER PUBLICATIONS

3GPP NR, Physical channels and modulation (Release 15), 3GPP TS 38.211 V15.0.0, Dec. 31, 2017.
3GPP NR, Physical layer procedures for data (Release 15), 3GPP TS 38.214 V15.0.0, Dec. 31, 2017.

* cited by examiner (A)

(B)

(C)

(D)

RESOURCE ALLOCATION AND VRB-TO-PRB MAPPING IN MOBILE COMMUNICATIONS

CROSS REFERENCE TO RELATED PATENT APPLICATION(S)

The present disclosure is part of a non-provisional application claiming the priority benefit of U.S. Patent Application Nos. 62/615,406, 62/616,034, 62/617,150, 62/619,077 and 62/620,405, filed on 9 Jan. 2018, 11 Jan. 2018, 12 Jan. 2018, 18 Jan. 2018 and 22 Jan. 2018, respectively, the contents of which are incorporated by reference in their entirety.

TECHNICAL FIELD

The present disclosure is generally related to mobile communications and, more particularly, to resource allocation and virtual resource block (VRB)-to-physical resource block (PRB) mapping in mobile communications.

BACKGROUND

Unless otherwise indicated herein, approaches described in this section are not prior art to the claims listed below and are not admitted as prior art by inclusion in this section.

In 5th-Generation (5G)/New Radio (NR) mobile communications, there are several definitions of aggregation of resource blocks relevant to the design of receivers and channel state information (CSI) feedback. With respect to resource block group (RBG) in resource allocation type 0 (RAT 0), its definition is referenced to the lowest PRB in a bandwidth part (BWP). With respect to PRB bundling (PRBD) in resource allocation type 1 (RAT 1), its definition is referenced to the size of a BWP, namely the number of PRBs in the BWP. With respect to precoding resource block group (PRG) for both RAT 0 and RAT 1, its definition is referenced to the so-called Reference Point A. In CSI acquisition, subbands, which are aggregated PRBs for sub-band-CSI reporting, are used. However, thus far it is not clear what reference is used in the definition of subbands. Additionally, under some configuration of a BWP, PRG and RBG could be misaligned. For example, a single RBG could belong to different PRGs, and this may happen in both RAT 0 and RAT 1. Moreover, the VRB-to-PRB mapping formula currently defined in the $3^{rd}$-Generation Partnership Project (3GPP) specification might not work properly for same cases.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

In one aspect, a method may involve a processor of a user equipment (UE) establishing a multiple-input multiple-output (MIMO) wireless communication link with a network node of a wireless network. The method may also involve the processor receiving data from the network node, the data represented by a plurality of resource block groups (RBGs) in a frequency domain in terms of resource allocation. The method may further involve the processor processing the data. In receiving the data, the method may involve the processor receiving the data in one or more precoding resource block groups (PRGs) of a plurality of PRGs in the frequency domain via the MIMO wireless communication link. The plurality of RBGs and the plurality of PRGs may be aligned in the frequency domain.

In one aspect, a method may involve a processor of a UE receiving a control signaling from a network node of a wireless network. The method may also involve the processor receiving data represented by a plurality of resource blocks in a frequency domain in a downlink transmission from the network node. The method may additionally involve the processor extracting one or more resource blocks from the data according to the control signaling. The method may further involve the processor processing the extracted one or more resource blocks. In extracting the one or more resource blocks, the method may involve the processor, in an event that interleaving is indicated in the control signaling, de-interleaving the plurality of resource blocks to obtain the one or more resource blocks according to a VRB-to-PRB mapping scheme which is defined in terms of resource block bundles regardless of whether a number of PRBs in a carrier BWP for the downlink transmission is an integer multiple of a resource block bundle size of a plurality of resource block bundles in the VRB-to-PRB mapping scheme.

In one aspect, an apparatus may include a transceiver and a processor coupled to the transceiver. The transceiver may be capable of wirelessly communicating with a network node of a wireless network via a MIMO wireless communication link. The processor may be capable of receiving, via the transceiver, data from the network node, with the data represented by a plurality of RBGs in a frequency domain in terms of resource allocation. The processor may also be capable of processing the data. In receiving the data, the processor may be capable of receiving the data in one or more PRGs of a plurality of PRGs in the frequency domain via the MIMO wireless communication link. The plurality of RBGs and the plurality of PRGs may be aligned in the frequency domain.

It is noteworthy that, although description provided herein may be in the context of certain radio access technologies, networks and network topologies such as 5G/NR mobile communications, the proposed concepts, schemes and any variation(s)/derivative(s) thereof may be implemented in, for and by other types of radio access technologies, networks and network topologies wherever applicable such as, for example and without limitation, Long-Term Evolution (LTE), LTE-Advanced, LTE-Advanced Pro, Internet-of-Things (IoT) and Narrow Band Internet of Things (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to resource allocation and VRB-to-PRB mapping in mobile communications. According to the present disclosure, a number of possible schemes/solutions may be implemented separately or jointly. That is, although these possible solutions may be described below separately, two or more of these possible solutions may be implemented in one combination or another.

It is believed that, by implementing one or more of the various schemes of alignment of PRG and RBG in accordance with the present disclosure, channel estimation for PRG and RBG may be performed jointly. Advantageously, robustness as well as overall system performance with respect to channel estimation may be improved. Moreover, by implementing one or more of the various schemes of VRB-PRB interleaving in accordance with the present disclosure, it is believed that issues associated with current block interleaver design may be avoided.

Figure 1:
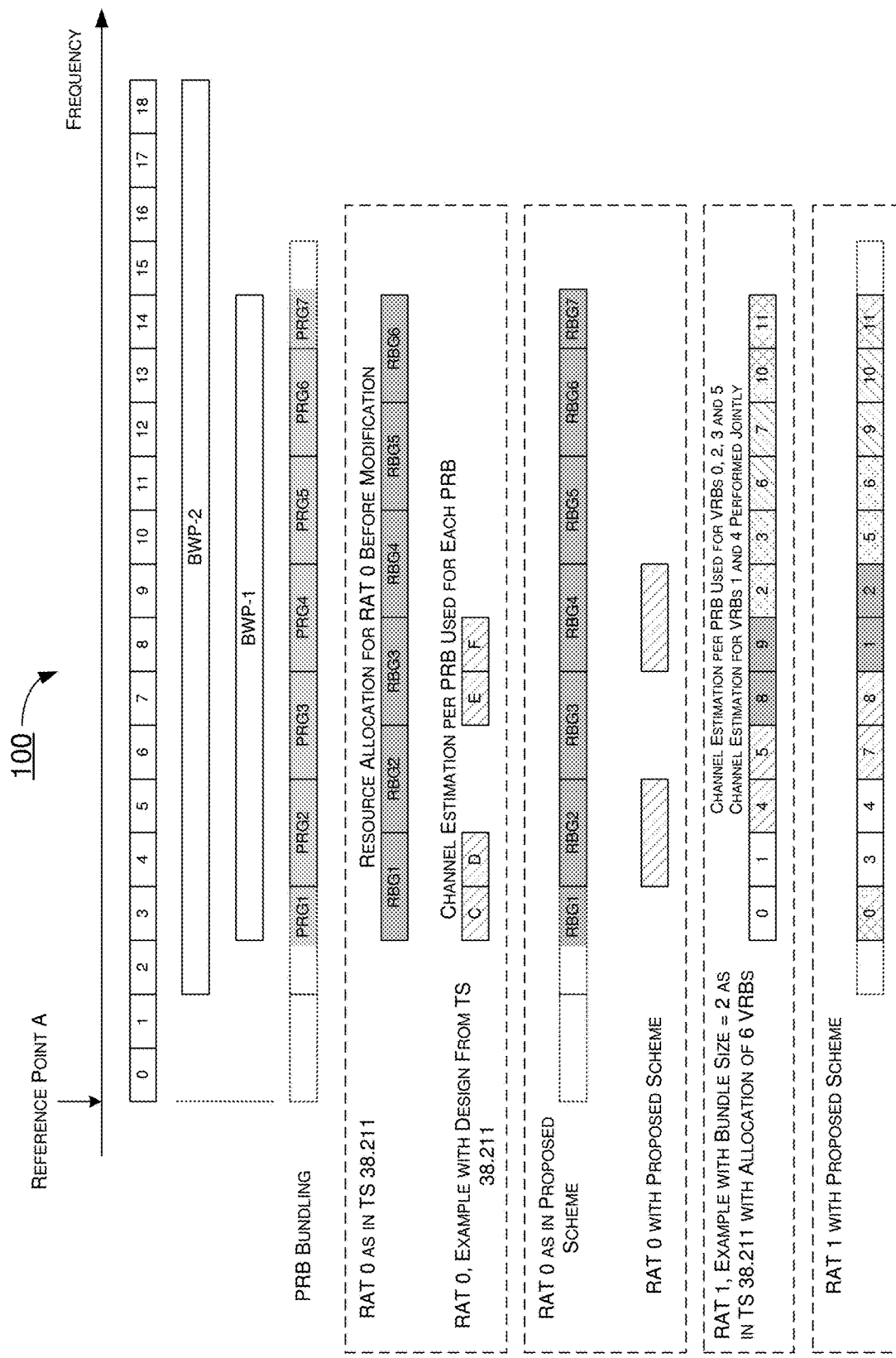
FIG. 1 is a diagram of an example scenario in accordance with an implementation of the present disclosure.

FIG. 1 illustrates an example scenario 100 in accordance with an implementation of the present disclosure. Referring to FIG. 1, in scenario 100, a plurality of frequency bands may include frequency band 0 (denoted as "0" in FIG. 1), frequency band 1 (denoted as "1" in FIG. 1), frequency band 2 (denoted as "2" in FIG. 1), ... and frequency band 18 (denoted as "18" in FIG. 1). A first BWP (denoted as "BWP-1" in FIG. 1) may corresponds to frequency bands 3~14, and a second BWP (denoted as "BWP-2" in FIG. 2) may correspond to frequency bands 2~18. Also, in scenario 100, a plurality of RBGs (e.g., RBG1~RBG6) and a plurality of PRGs (e.g., PRG1~PRG7) may be defined.

Under a proposed scheme in accordance with the present disclosure, both the RBGs and PRGs may be defined and divided/partitioned in the frequency domain with respect to the same reference point, which is Reference Point A in scenario 100. Accordingly, even though the size of an individual PRG may be the same as or greater than an individual RBG (e.g., as an integer multiple thereof), the RBGs and PRGs are aligned as shown in FIG. 1. For instance, the size of a given RBG may depend on a BWP size, and RBG size may be one of the values in the set {1, 2, 4, 8, 16}. Additionally, PRG size may be one of the values in the set {2, 4, wideband}, where "wideband" (e.g., entire allocation band) may not be of interest in the context of the present disclosure. Thus, RBG size and PRG size may not necessarily be the same; one RBG may correspond to one or more PRGs, and vice versa. Advantageously, the division/ partition line between two adjacent PRGs would be aligned to the division/partition line between two corresponding and adjacent RBGs instead of falling within one of the RBGs.

Thus, under the proposed scheme in accordance with the present disclosure, PRGs and RBGs may be aligned to Reference Point A, and RBGs are aligned with $N_{BWP,i}^{start}$. In the example shown in FIG. 1, for RAT 0, each RBG is aligned with a respective PRG. For instance, RBG1 is aligned with PRG1, RBG2 is aligned with PRG2, RBG3 is aligned with PRG3, RBG4 is aligned with PRG4, RBG5 is aligned with PRG5, RBG6 is aligned with PRG6, and RBG7 is aligned with PRG7. Similarly, for RAT 1, each PRB-VRB bundle is aligned with a respective PRG. For instance, bundle 0 is aligned with PRG1, bundles 3 and 4 are aligned with PRG2, bundles 7 and 8 are aligned with PRG3, bundles 1 and 2 are aligned with PRG4, bundles 5 and 6 are aligned with PRG5, bundles 9 and 10 are aligned with PRG6, and bundle 11 is aligned with PRG7. Accordingly, channel estimation for PRB in a RGB may be performed jointly, and channel estimation robustness and performance may be improved.

In contrast to the proposed schemes in accordance with the present disclosure, according to current 5G/NR design and under some configurations of a BWP, it may happen that the PRG and RBG/PRBD are misaligned, thereby preventing a UE receiver from exploiting correlated channel conditions on adjacent PRBs (e.g., utilizing PRB bundles in channel estimation). Consequently, inferior channel estimation performance may result.

Figure 2:
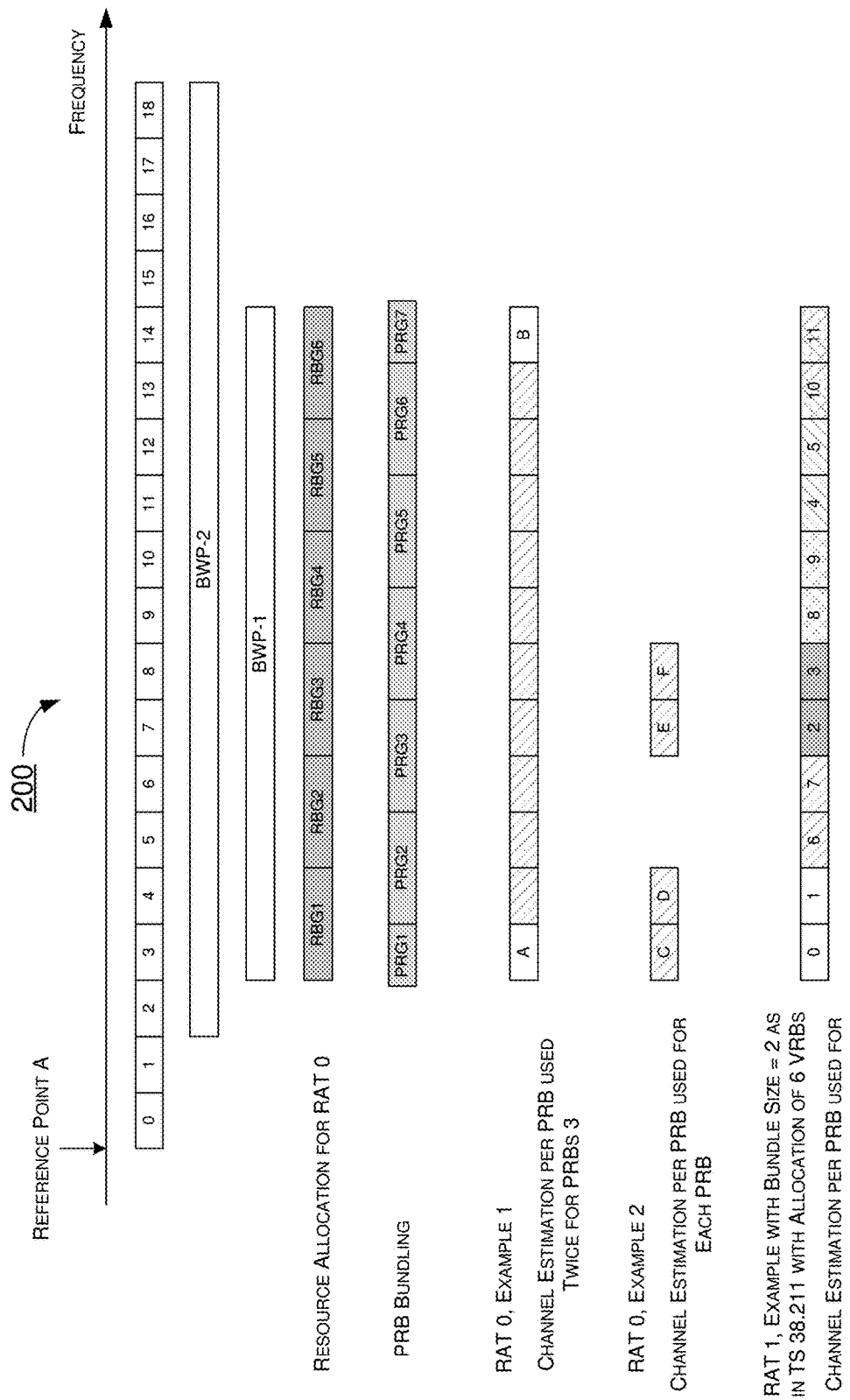
FIG. 2 is a diagram of an example scenario showing several examples of issues with current 5G/NR design.

FIG. 2 is a diagram of an example scenario 200 showing several examples of issues with current 5G/NR design. In particular, in example 2 (RAT 0) shown in FIG. 2, PRBs "C" and "D" are adjacent to each other, yet they belong to different PRGs. Consequently, a UE would need to perform channel estimation separately for PRB "C" and PRB "D" (single PRB channel estimation), and the UE would not be able to perform channel estimation jointly over PRBs "C" and "D." Additionally, in example 3 (RAT 1 with bundle size=2) shown in FIG. 2, PRBs "0", "1", "2", "3", "4" and "5" belong to different PRGs. Consequently, a UE would need to perform single PRB channel estimation.

Alignment of RBG and PRG

With respect to alignment of RBG and PRG, the definitions of RBG and PRBD need to be aligned with the definition of PRG. Under a proposed scheme in accordance with the present disclosure, precoding resource block groups (PRGs) of size $P_{BWP,i}'$, may partition a carrier bandwidth part i, and each PRG may include consecutive PRBs which may be one of several values among {2, 4, scheduled bandwidth}. In an event that a UE is configured with PRG of "scheduled bandwidth", the UE may not be expected to be scheduled with non-contiguous resource allocation. The PRG for each carrier bandwidth part may be configured by higher-layer parameters prbBndling and pdsch-BundleSsize, otherwise the PRG size may be equal to two PRBs. For instance, a first PRG size may be given by, $P_{BWP,i}'-(N_{BWP,i}^{start} \mod P_{BWP,i}')$, and a last PRG size may be given by $(N_{BWP,i}^{start}+N_{BWP,i}^{size}) \mod P_{BWP,i}'$. Here, $N_{BWP,i}^{start}$ may be the starting PRB index of the BWP with respect to Reference Point A, and $N_{BWP,i}^{size}$ may be the number of PRBs in the BWP.

To align the definition of RBG and PRG, in general, the set of PRBs used to define RBGs (herein referred to as "PRB resource Set Type 0" or "PST-0") may be a superset of the PRBs in a BWP, for example. Additionally, PST-0 may include all the PRBs in the BWP, and $(N_{BWP,i}^{start} \mod P_{BWP,i}')$ PRBs immediately preceding the lowest PRB in the BWP. By omitting the BWP index i to avoid cumbersome notations, it may be set that $X=_{BWP,i}^{start} \mod P_{BWP,i}'$ with the understanding that X is a BWP-dependent parameter. Thus, the total number of RBGs ($N_{RBG}$) for a downlink carrier bandwidth part of size $N_{BWP,i}^{size}$ PRBs may be given by $N_{RBG}=\lceil(N_{BWP,i}^{size}+X)/P\rceil$, where the first RBG is of size P–X.

In case of $(N_{BWP,i}^{size}+X) \mod P>0$, then the last RBG may be of size $(N_{BWP,i}^{size}+X)-P \cdot \lfloor(N_{BWP,i}^{size}+X)/P\rfloor$. Moreover, the $N_{RBG}-2$ RBGs between the first RBG and the last RBG is of size P. Otherwise, the $N_{RBG}-1$ RBGs after the first RBG may be of size P.

The bitmap may be of size $N_{RBG}$ bits with one bitmap bit per RBG such that each RBG is addressable. The RBGs may be indexed in an order of increasing frequency starting at a lowest frequency of the carrier bandwidth part. The order of RBG bitmap may be such that RBG 0 to RBG $N_{RBG}-1$ may be mapped from a most-significant bit (MSB) to a least-significant bit (LSB). The RBG may be allocated to the UE in case that a corresponding bit value in the bitmap is 1, and the RBG may be not allocated to the UE otherwise. It is noteworthy that, in some configurations, the first RBG and the last RBG may be of a size less than P. In case that the size of RBGs need to be kept as non-increasing, then the following procedure may be used:

Let $K=N_{BWP,i}$, RBG j is for virtual RBs with indices from $G_j$, where:

$G_j=\{n, n \in \{j \cdot P, j \cdot P+1, \Lambda, j \cdot P+P-1\}$ and $0 \le n \le K-1\}$ VRB with index $j \cdot P+m$, $0 \le j \cdot P+m \le K-1$ is mapped to PRB with index g(j,m), where:

$g(j,m) = \mod(j \cdot P + m + \mod(P-X, P), K)$

Alignment of PRBD and PRG

With respect to alignment of PRBD and PRG, for RAT 1 the current design in NR for a higher-layer parameter VRB-to-PRB-interleaver is denoted as described below. A virtual resource block bundle j is mapped to a physical resource block bundle f(j), where:

$f(j)=rC+c$ $j=cR+r$ $r=0,1,\ldots,R-1$ $c=0,1,\ldots,C-1$ $R=2$ $C=\lceil(N_{BWP,i}^{size})/(LR)\rceil$ When $N_{BWP,i}^{size}=9$, L=4, it can be seen that the formula in 3GPP TS 38.211 does not generate correct VRB-to-PRB mapping. For instance, VRBs [0 1 2 3 8 9 10 11 4] may be mapped to PRBs 0~8 in the BWP, whereas PRB indices 8, 9, 10 and 11 should not be included at all. To rectify the flaw in the current design in NR, and to align PRBD and PRG, various schemes are proposed herein and described below.

Under a proposed scheme with respect to alignment of PRBD and PRG, for RAT 0, in the NR design the RBG size is no smaller than the PRG size. In RAT 1, the PRBD size has a similar role as the RBG size in RAT 0. Hence, the rule that the PRBD size (L) is not smaller than the PRG size may also be enforced.

Under the proposed scheme, the following may be assumed:

$X=N_{BWP,i}^{start} \mod P_{BWP,i}'$ $K=N_{BWP,i}^{size}$ $C=\lceil(K+X)/(LR)\rceil$ If X>0, a length x sequence may be generated and denoted as sequence 1. Sequence 1 may include integers from –X to –1. For instance, sequence 1 may be given by [–X, Λ, –1]; otherwise, sequence 1 may be null. Then, a sequence 2 of length C·L·R–X may be generated. Sequence 2 may include integers from 0 to (C·L·R–X–1). For instance, sequence 2 may be given by [0, 1, Λ, CLR–X–1]. Next, sequence 1 and sequence 2 may be concatenated to obtain a sequence A. If X>0, sequence A may be given by [–X, Λ, –1, 0, 1, Λ, (C·L·R–X–1)]; otherwise, sequence A may be given by [0, 1, Λ, (C·L·R–1)]. Then, sequence A may be divided into index bundles in the frequency domain. For instance, for $j=c \cdot R+r$, $0 \le c \le C-1$, $0 \le r \le R-1$, bundle j may include the following indices:

$B_j$ (or $B_{c,r}$ with indices of c and r)=$\{j \cdot L-X, j \cdot L-X+1, \Lambda, j \cdot L-X+L-1\}$.

It is noteworthy that there is a one-to-one mapping between j and (c,r). Next, a "trimmed index bundle" may be defined. That is, for $j=c \cdot R+r$, $0 \le c \le C-1$, $0 \le r \le R-1$, trimmed index bundle j may include the following:

$T_j$ (or $T_{c,r}$ with indices of c and r)=$\{n, n \in \{j \cdot L-X, j \cdot L-X+1, \Lambda, j \cdot L-X+L-1\}$ and $0 \le n \le K-1\}$ Let $N_{c,r}$ be the number of indices in trimmed index bundle j. In some cases $N_{c,r}$ may be less than L or even 0. If $N_{c,r}>0$, the indices $I_{c,r,m}$ in trimmed index bundle j may be arranged in an ascending order as follows:

$I_{c,r,0} < \Lambda < I_{c,r,N_{c,r}-1}$.

Then, for any $N_{c,r}>0$, the virtual PRB index $I_{c,r,m}$, $0 \le m \le N_{c,r}-1$, may be mapped to PRB with index f(c,r,m) as follows:

$$f(c, r, m) = \sum_{r'=0}^{r-1} \sum_{c'=0}^{C-1} N_{c',r'} + \sum_{c''=0}^{c-1} N_{c'',r} + m$$

It can be seen that, with this design, all VRB indices in [0: K–1] may be mapped to PRBs in the BWP. When $N_{BWP,i}^{size}=9$, L=4, X=0, the mapping may be given by VRBs [0 1 2 3 8 4 5 6 7] to PRBs 0~8. If x=3, the mapping may be given by VRBs [0 5 6 7 8 1 2 3 4] to PRBs 0~8.

However, there may still be misalignment which prevents per-codeblock processing. The log-likelihood ratios (LLRs) for VRB 12 may be calculated along with VRB 2, yet it may not be used for low-density parity check (LDPC) decoding much later. To address such issue, there are a number of approaches under the proposed scheme in accordance with the present disclosure.

In a first approach, the block interleaver may be defined for $T_{c,r}$, $0 \leq c \leq (C-2)$, $0 \leq r \leq R-1$, with $T_{C-1,0}$ and $T_{C-1,1}$ being appended to the resultant sequence.

In some cases, under the first approach, the following may be assumed:

$$X = N_{BWP,i}^{start} \mod P_{BWP,i}' \text{ or}$$

$$X = N_{BWP,i}^{start} \mod L, K = N_{BWP,i}^{size}.$$

If alignment between PRB bundle and PRG is not used, then the value of X may be set to 0 (i.e., X=0). Let $K' = \lfloor (X+K)/L \rfloor \times L$ and $W = (X+K) - K'$. Virtual resource block j, $0 \leq j \leq K'-X-1$ may be mapped to physical resource block f(j), where:

$$j' = j + X,$$

$$f(j) = (rC+c)L + \mod(j', L) - X$$

$$\lfloor j'/L \rfloor = cR + r$$

$$0 \leq r \leq R-1$$

$$0 \leq c \leq C-1$$

$$R = 2$$

$$C = \lceil (K')/(LR) \rceil$$

Virtual resource block j for $K-W \leq j \leq K-1$, if any, may be mapped to physical resource block j.

In a second approach, if $N_{C-1,0} = L$, no modification may be needed in defining the trimmed index bundle. If $N_{C-1,0} < L$, then $N_{C-1,1} = 0$. In this case, the bundles $C_{C-1,0}$ and $C_{C-1,1}$ may be swapped as follows:

new $T_{C-1,0} \leftarrow T_{C-1,1}$ and new $T_{C-1,1} \leftarrow T_{C-1,0}$

At the same time, $N_{c,r}$ may be updated according to the modified trimmed index bundles. After swapping, the mapping of virtual PRB index $I_{c,r,m}$ to PRB with index f(c,r,m) may be executed. A complete procedure for the second approach is provided below.

Under the second approach, the following may be assumed:

$$X = _{BWP,i}^{start} \mod P_{BWP,i}'$$

$$K = N_{BWP,i}^{size}$$

$$C = \lceil (K+X)/(LR) \rceil$$

$$C = \lceil (K+X)/(LR) \rceil$$

If X>0, a length X sequence may be generated and denoted as sequence 1. Sequence 1 may include integers from X to −1. For instance, sequence 1 may be given by [−X, Λ, −1]; otherwise, sequence 1 may be null. Then, a sequence 2 of length C·L·R−X may be generated. Sequence 2 may include integers from 0 to (C·L·R−X−1). For instance, sequence 2 may be given by [0, 1, Λ, CLR−X−1]. Next, sequence 1 and sequence 2 may be concatenated to obtain a sequence A. If X>0, sequence A may be given by [−X, Λ, −1, 0, 1, Λ, (C·L·R−X−1)]; otherwise, sequence A may be given by [0, 1, Λ, (C·L·R−1)]. Then, sequence A may be divided into index bundles in the frequency domain. For instance, for j=c·R+r, $0 \leq c \leq C-1$, $0 \leq r \leq R-1$ bundle j may include the following indices:

$B_j$ (or $B_{c,r}$ with indices of c and r)={j·L−X, j·L−X+1, Λ, j·L−X+L−1}.

It is noteworthy that there is a one-to-one mapping between j and (c,r). Next, a "trimmed index bundle" may be defined. That is, for j=c·R+r, $0 \leq c \leq C-1$, $0 \leq r \leq R-1$, trimmed index bundle j may include the following:

$T_j$ (or $T_{c,r}$ with indices of c and r)={n, n∈{j·L−X, j·L−X+1, Λ, j·L−X+L−1} and $0 \leq n \leq K-1$}

Let $N_{c,r}$ be the number of indices in trimmed index bundle j. In some cases $N_{c,r}$ may be less than L or even 0. If $N_{c,r} > 0$, the indices $I_{c,r,m}$ in trimmed index bundle j may be arranged in an ascending order as follows:

$$I_{c,r,0} < \Lambda < I_{c,r,N_{c,r}-1}.$$

If $N_{C-1,0} < L$ (with $N_{C-1,1} = 0$ being a consequence), the bundles $T_{C-1,0}$ and $T_{C-1,1}$ may be swapped as follows: new $T_{C-1,1} \leftarrow T_{C-1,0}$, new $N_{C-1,1} \leftarrow N_{C-1,0}$, new $T_{C-1,0} \leftarrow$ Null, new $N_{C-1,0} \leftarrow 0$.

Then, for any $N_{c,r} > 0$, the virtual PRB index $I_{c,r,m}$, $0 \leq c \leq C-1$, $0 \leq r \leq R-1$, $0 \leq m \leq N_{c,r}-1$, may be mapped to PRB with index f(c,r,m) as follows:

$$f(c, r, m) = \sum_{r'=0}^{r-1} \sum_{c'=0}^{C-1} N_{c',r'} + \sum_{c''=0}^{c-1} N_{c'',r} + m$$

It is noteworthy that the second approach may be further modified so the leading VRB bundle always has a size of L.

Under a third approach, the following may be assumed:

$$X = _{BWP,i}^{start} \mod P_{BWP,i}'$$

$$K = _{BWP,i}^{size}$$

$$C = \lceil (K+X)/(LR) \rceil$$

Under the third approach, a sequence A of length C·L·R may be generated. Sequence A may include integers from 0 to (C·L·R−1). For instance, sequence 2 may be given by [0, 1, Λ, CLR−1]. Sequence A may be divided into index bundles in the frequency domain. For j=c·R+r, $0 \leq c \leq C-1$, $0 \leq r \leq R-1$, bundle j may include the following indices:

$B_j$ (or $B_{c,r}$, with indices of c and r)={j·L, j·L+1, Λ, j·L+L−1}.

It is noteworthy that there is a one-to-one mapping between j and (c,r). Next, a "trimmed index bundle" may be defined. That is, for j=c·R+r, $0 \leq c \leq C-1$, $0 \leq r \leq R-1$, trimmed index bundle j may include the following:

$T_j$ (or $T_{c,r}$ with indices of c and r)={n, n∈{j·L, j·L+1, Λ, j·L+L−1} and $0 \leq n \leq K-1$}

Let $N_{c,r}$ be the number of indices in trimmed index bundle j. In some cases $N_{c,r}$ may be less than L or even 0. If $N_{c,r} > 0$, the indices $I_{c,r,m}$ in trimmed index bundle j may be arranged in an ascending order as follows:

$$I_{c,r,0} < \Lambda < I_{c,r,N_{c,r}-1}.$$

If $N_{C-1,0} < L$ (with $N_{C-1,1} = 0$ being a consequence), the bundles $T_{C-1,0}$ and $T_{C-1,1}$ may be swapped as follows: new $T_{C-1,1} \leftarrow T_{C-1,0}$, new $N_{C-1,1} \leftarrow N_{C-1,0}$, new $T_{C-1,0} \leftarrow$ Null, new $N_{C-1,0} \leftarrow 0$.

Then, for any $N_{c,r} > 0$, the virtual PRB index $I_{c,r,m}$, $0 \leq c \leq C-1$, $0 \leq r \leq R-1$, $0 \leq m \leq N_{c,r}-1$, may be mapped to PRB with index f(c,r,m) as follows:

$$f(c, r, m) = \mod\left(\sum_{r'=0}^{r-1}\sum_{c'=0}^{C-1} N_{c',r'} + \sum_{c''=0}^{c-1} N_{c'',r} + m + \mod(L-X, L), K\right)$$

Under a fourth approach, the following may be assumed:

$X = N_{BWP,i}^{start} \mod P_{BWP,i}'$ $K = _{BWP,i}^{size}$

If X=0, S=0; otherwise S=L−Z. Let K'=K−S and W=mod (K',L). Let K"=K'−W. Virtual resource block j+S, 0≤j≤K"−1, may be mapped to physical resource block f(A, where:

$f(j) = (rC+c)L + S$ $\lfloor j/L \rfloor cR + r$ $r = 0, 1, \ldots, R-1$ $c = 0, 1, \ldots, C-1$ $R = 2$ $C = \lceil (K")/(LR) \rceil$ Virtual resource block j, 0≤j≤S−1 or K"+S≤j≤K−1, may be mapped to physical resource block j. There may be two alternatives under the fourth approach, as described below.

Under a first alternative of the fourth approach, the following may be assumed:

$X = _{BWP,i}^{start} \mod P_{BWP,i}'$ $K = _{BWP,i}^{size}$

If X=0, S=0; otherwise S=L−X. If alignment between PRBD and PRG is not used, then S=0 always. If S≠0, then A=L, or else A=0.

Let K'=K−S, W=mod(K', L) and K"=K−W. Virtual resource block j+S, 0≤j≤K"−1, may be mapped to physical resource block f(j), where:

$j' = j + A$ $f(j) = (rC+c)L + \mod(j', L) + S - A$ $\lfloor j'/L \rfloor = cR + r$ $0 \le r \le R-1$ $0 \le c \le C-1$ $R = 2$ $C = \lceil (K"+A)/(LR) \rceil$ Virtual resource block j, 0≤j≤S−1 or K"+S≤j≤K−1, may be mapped to physical resource block j.

Under a second alternative of the fourth approach, the following may be assumed:

$X = _{BWP,i}^{start} \mod P_{BWP,i}'$ $K = N_{BWP,i}^{size}$

If x=0, S=0; otherwise S=L−X. If alignment between PRBD and PRG is not used, then S=0 always. If S≠0, then A=L, or else A=0.

Let K'=K−S, W=mod(K',L) and K"=K'−W+A. Virtual resource block j, 0≤j≤S+K"−1, may be mapped to physical resource block f(j), where:

$j' = j + X$ $f(j) = (rC+c)L + \mod(j', L) - X$ $\lfloor j'/L \rfloor = cR + r$ $0 \le r \le R-1$ $0 \le c \le C-1$ $R = 2$ $C = \lceil (K")/(LR) \rceil$ Virtual resource block j, S+K"K−1, may be mapped to physical resource block j.

Under a fifth approach, the following may be assumed:

$X = N_{BWP,i}^{start} \mod P_{BWP,i}'$ $K = _{BWP,i}^{size}$

If x=0, S=0; otherwise S=L−X. Let K'=K−S and W=mod (K', L). Let K"=K'−W. Virtual resource block j, 0≤j≤K"−1, may be mapped to physical resource block f(j), where:

$f(j) = (rC+c)L + S$ $\lfloor j/L \rfloor = cR + r$ $r = 0, 1, \ldots, R-1$ $c = 0, 1, \ldots, C-1$ $R = 2$ $C = \lceil (K")/(LR) \rceil$ For virtual resource block K", either of two options (option 1 and option 2), as described below, may be utilized.

Under option 1, virtual resource block j+K", 0≤j≤S−1, may be mapped to physical resource block j. Moreover, virtual resource block j, K"+S≤j≤K−1, may be mapped to physical resource block j.

Under option 2, virtual resource block j+, 0≤j≤S−1, may be mapped to physical resource block j. Moreover, virtual resource block j−S, K"+S≤j≤K−1, may be mapped to physical resource block j.

Alignment of PRG Resource Allocation with RAT 0

With respect to alignment of PRG resource allocation with RAT 0, under a proposed scheme in accordance with the present disclosure, it may be assumed that $X = N_{BWP,i}^{start} \mod P$. The total number of PRGs ($N_{RBG}$) for a downlink carrier bandwidth part of size $N_{BWP,i}^{size}$ PRBs may be given by $N_{RBG} \le \lceil (N_{BWP,i}^{size})/P \rceil$, where the first RBG is of size P−X.

If $(N_{BWP,i}^{size} + X) \mod P > 0$, then the last RBG is of size $(N_{BWP,i}^{size} + X) - P \cdot \lfloor (N_{BWP,i}^{size} + X)/P \rfloor$, and the $N_{RBG} - 2$ RBGs between the first RBG and the last RBG is of size P; otherwise the $N_{RBG} - 1$ RBGs after the first RBG is of size P. The bitmap may be of size $N_{RBG}$ bits with one bitmap bit per RBG such that each RBG is addressable. The RBGs may be indexed in an order of increasing frequency starting at the lowest frequency of the carrier bandwidth part. The order of RBG bitmap may be such that RBG 0 to RBG $N_{RBG} - 1$ are mapped from MSB to LSB. The RBG may be allocated to a UE if a corresponding bit value in the bitmap is 1, and the RBG may be not allocated to the UE otherwise.

Alignment of PRG Resource Allocation with RAT 1

With respect to alignment of PRG resource allocation with RAT 1, under a proposed scheme in accordance with the present disclosure, virtual resource block n may be mapped to physical resource block n for non-interleaved VRB-to-PRB mapping. For interleaved VRB-to-PRB mapping, the mapping process may be defined in terms of resource block bundles. For instance, resource block bundle i may be defined as resource blocks {iL, iL+1, ..., iL+L−1} where L denotes the bundle size provided by the higher-layer parameter VRB-to-PRB-interleaver.

Virtual resource block bundle j may be mapped to physical resource block f(j), where:

$$f(j) = rC + c$$

$$j = cR + r$$

$$r = 0, 1, \ldots, R-1$$

$$c = 0, 1, \ldots, C-1$$

$$R = 2$$

$$C = \lceil N_{BWP,i}^{size} / (LR) \rceil$$

Here, $N_{BWP,i}^{size}$ represents the size of the carrier bandwidth part in which the physical downlink shared channel (PDSCH) is transmitted.

Under the proposed scheme, a UE may assume that the same precoding in the frequency domain is used across a bundle of common resource blocks numbered s, s+1, ..., s+w−1, where s=0, w, 2w, 3w, ..., and the bundle size w may be given by a higher-layer parameter PDSCH-bundle-size if configured, or by the DCI scheduling the transmission otherwise. The UE may not make any assumption that the same precoding is used for different bundles of common resource blocks.

VRB-to-PRB Mapping

With respect to VRB-to-PRB mapping, VRB-PRB interleaving can be handled correctly with a block interleaver as defined in TS 38.214 for the case where the PRB-VRB bundle size divides the number of PRBs in a BWP in the frequency domain. However, when the PRB-VRB bundle size does not divide the number of PRBs in a BWP evenly (i.e., not a factor thereof), current block interleaver as defined in TS 38.214 does not provide a valid outcome of interleaving.

Figure 3:
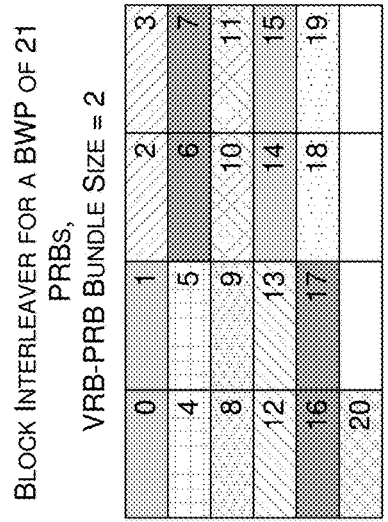
FIG. 3 is a diagram of example scenarios of interleaving with a block interleaver as defined in 3GPP technical specification (TS) 38.214.
Figure 3:
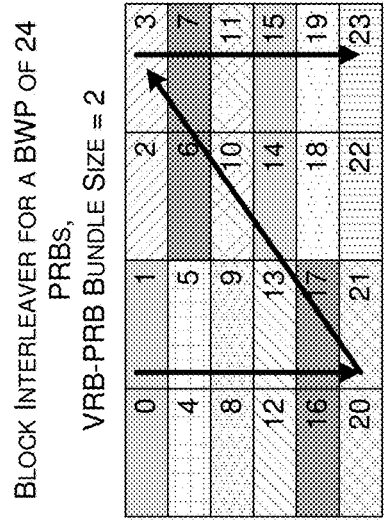

FIG. 3 shows example scenarios 300A and 300B of interleaving with a block interleaver as defined in TS 38.214. Referring to part (A) of FIG. 3, in scenario 300A, current block interleaver as defined in TS 38.214 can properly handle VRB-PRB interleaving over a BWP having twenty-four PRBs with a PRB-VRB bundle size of two. Referring to part (B) of FIG. 3, in scenario 300B, current block interleaver as defined in TS 38.214 would not be able to handle interleaving when there are twenty-one PRBs in the BWP with a VRB-PRB bundles size of two.

Figure 4:
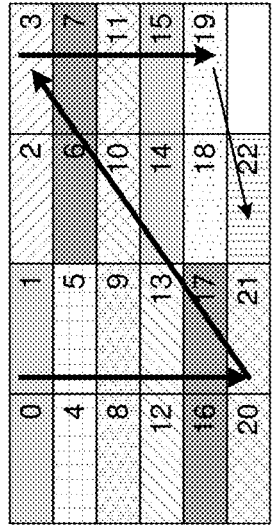
FIG. 4 is a diagram of example scenarios of VRB-PRB interleaving in accordance with an implementation of the present disclosure.
Figure 4:
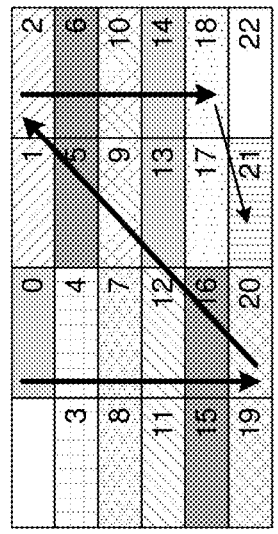
Figure 4:
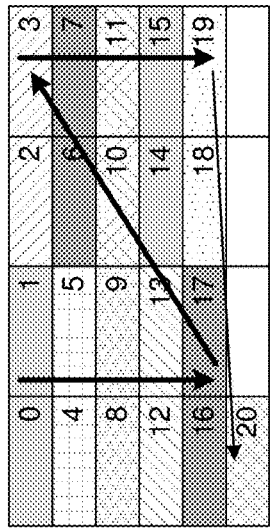
Figure 4:
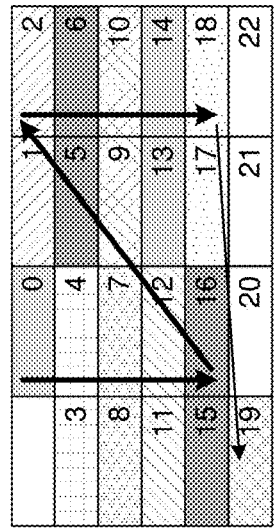

FIG. 4 illustrates example scenarios 400A, 400B, 400C and 400D of VRB-PRB interleaving in accordance with an implementation of the present disclosure. Referring to part (A) of FIG. 4, in scenario 400A, VRB-PRB interleaving under a proposed scheme in accordance with the present disclosure can be properly performed over a BWP having twenty-one PRBs with a PRB-VRB bundle size of two. Referring to part (B) of FIG. 4, in scenario 400B, VRB-PRB interleaving under the proposed scheme can be properly performed over a BWP having twenty-three PRBs with a PRB-VRB bundle size of two. Referring to part (C) of FIG. 4, in scenario 400C, VRB-PRB interleaving under the proposed scheme can be properly performed over a BWP having twenty PRBs with a PRB-VRB bundle size of two. It is noteworthy that the starting PRB in the BWP may not be aligned with a PRG. Referring to part (D) of FIG. 4, in scenario 400D, VRB-PRB interleaving under the proposed scheme can be properly performed over a BWP having twenty-two PRBs with a PRB-VRB bundle size of two. It is noteworthy that the starting PRB in the BWP may not be aligned with a PRG.

Under a proposed scheme in accordance with the present disclosure, the overall design of current block interleaver as defined in TS 38.214 may be retained with some modification so that the block interleaver can handle any BWP size. Under the proposed scheme, virtual resource blocks may be mapped to physical resource blocks according to a mapping scheme used in VRB-PRB interleaving as indicated in a control signaling from the network, for both non-interleaved and interleaved mapping. In an event that no mapping scheme (e.g., no interleaving) is indicated by the network, virtual resource blocks may be mapped to physical resource blocks according to non-interleaved mapping under a proposed scheme in accordance with the present disclosure. For non-interleaved VRB-to-PRB mapping, a virtual resource block n may be mapped to a physical resource block n. For interleaved VRB-to-PRB mapping, the mapping process may be defined in terms of resource block bundles under a proposed scheme in accordance with the present disclosure, as described below.

Under the proposed scheme, a resource block bundle of size L may partition a carrier bandwidth part i, and each resource block bundle may include consecutive resource blocks. The bundle size L may be provided by a higher-layer parameter VRB-to-PRB-interleaver or, alternatively, fixed at a predefined value (e.g., 2) in an event that the higher-layer parameter VRB-to-PRB-interleaver is not applicable. Under the proposed scheme, a first resource block bundle size may be expressed as $L - N_{BWP,i}^{start} \bmod L$, and a last resource block bundle size may be expressed as either $W = (N_{BWP,i}^{start} + N_{BWP,i}^{size}) \bmod L$, when W is not zero, or L otherwise.

Under the proposed scheme, a virtual resource block bundle j except a last virtual resource block bundle may be mapped to physical resource block bundle f(j), where:

$$f(j) = rC + c$$

$$j = cR + r, \ 0 \leq j \leq N$$

$$r = 0, \ldots, R-1$$

$$c = 0, 1, \ldots, C-1$$

$$R = 2$$

$$N + \lceil (N_{BWP,i}^{size} + N_{BWP,i}^{start} \bmod L) / L \rceil - 1$$

$$C = \lceil N/R \rceil$$

Here, $N_{BWP,i}^{size}$ represents the size of the carrier bandwidth part in which a physical uplink shared channel (PUSCH) is transmitted. Moreover, the last virtual resource block bundle may be mapped to the last physical resource block bundle.

Under a proposed scheme in accordance with the present disclosure, with respect to VRB-to-PRB mapping for RAT 1, the following may be assumed: $X = N_{BWP,i}^{start} \bmod L$, $K = N_{BWP,i}^{size}$. If alignment between PRB bundle and PRG is not used, then the value of X may be set to 0 (e.g., X=0). Moreover, the following may be assumed:

$$K' = \lfloor (X+K)/L \rfloor \times L,$$

$$W = (X+K) - K',$$

$C = \lceil (K')/(LR) \rceil$, $R=2$.

Virtual resource block j, $0 \leq j \leq K'-X-1$, may be mapped to physical resource block f(j), where:

$j' = j+X$, $\lfloor L'/L \rfloor = cR+r$, $0 \leq r \leq R-1, 0 \leq c \leq C-1$, $f(j) = (rC+c)L + \mathrm{mod}(j', L) - X$.

Virtual resource block j for $K-W \leq j \leq K-1$, if any, may be mapped to physical resource block j.

Under another proposed scheme in accordance with the present disclosure, with respect to VRB-to-PRB mapping for RAT 1, the following may be assumed: $X = N_{BWP,i}^{start} \mod P_{BWP,i}'$, or $X = N_{BWP,i}^{start} \mod L$, $K = N_{BWP,i}^{size}$. If alignment between PRB bundle and PRG is not used, then the value of X may be set to 0 (e.g., X=0). Moreover, the following may be assumed:

$K' = \lfloor (X+K)/L \rfloor \times L$, $W = (X+K) - K'$

Virtual resource block j, $0 \leq j \leq K'-X-1$, may be mapped to physical resource block f (j), where:

$j' = j+X$, $f(j) = (rC+c)L + \mathrm{mod}(j', L) - X$ $\lfloor j'/L \rfloor = cR+r$ $0 \leq r \leq R-1$ $0 \leq c \leq C-1$ $R=2$ $C = \lceil (K')/(LR) \rceil$ Virtual resource block j for $K-W \leq j \leq K-1$, if any, may be mapped to physical resource block j.

Under a proposed scheme in accordance with the present disclosure, with respect to VRB-to-PRB mapping, the following may be assumed: $X = N_{BWP,i}^{start} \mod L$, $K = N_{BWP,i}^{size}$. If alignment between PRB bundle and PRG is not used (e.g., for PUSCH), then the value of X may be set to 0 (e.g., X=0). Moreover, the following may be assumed:

$N_{bundle} \lfloor (X+K)/L \rfloor$, $W \mod (X+K, L)$, $C = \lceil N_{bundle}/R \rceil$, $R=2$.

Thus, VRB bundle 0 may include VRBs 0 to $-X-1$: $\{0, \ldots, L-X-1\}$. Moreover, PRB bundle 0 may include PRBs 0 to $-X-1$: $\{0, \ldots, L-X-1\}$. For $1 \leq j \leq N_{bundle}-1$, VRB bundle j may include VRBs jL-X to (j+1)L-X-1: $\{jL-X, jL-X+1, \ldots, (j+1)L-X-1\}$, and PRB bundle j may include PRBs jL-X to (j+1)L-X-1: $\{jL-X, jL-X+1, \ldots, (j+1)L-X-1\}$.

Virtual resource block bundle j, $0 \leq j \leq N_{bundle}-1$, may be mapped to physical resource block bundle f(j), where:

$f(j) = rC+c$ $j = cR+r$ $r = 0, 1, \ldots, R-1$ $c = 0, 1, \ldots, C-1$

If W>0, VRB bundle $N_{bundle}$ may include VRBs K-W to K-1: $\{K-W, \ldots, K-1\}$. Additionally, PRB bundle $N_{bundle}$ may include PRBs K-W to K-1: $\{K-W, \ldots, K-1\}$. Moreover, VRB bundle $N_{bundle}$ may be mapped to PRB bundle $N_{bundle}$.

It is noteworthy that, in an event that Reference Point A can be different for different UEs, then it may be necessary to configure X as an offset signaled in radio resource control (RRC) signaling rather than as derived from the above formula. Moreover, under a proposed scheme in accordance with the present disclosure, the value of L, the bundle size provided by the higher-layer parameter VRB-to-PRB-interleaver, and the PRG size may be set according to a predefined rule. That is, when L=2, PRG size can be set to 2 but not 4. Also, when L=4, PRG size can be set to 4 but not 2.

It is also noteworthy that, for both RAT 0 and RAT 1, it may happen that some PRBs in a BWP may be taken by other signals and/or channels, such as signal synchronization blocks (SSBs). Under a proposed scheme in accordance with the present disclosure, resource definitions for RAT 0 and RAT 1 may not be modified by the existence of such signals/channels. When a RBG or PRB bundle in RAT 1 is mapped to certain PRBs which contain such signals/channels, the resource elements (REs) occupied by those signals/channels may not be available for resource mapping. In other words, REs occupied by those signals/channels may be through rate-matching.

Illustrative Implementations

Figure 5:
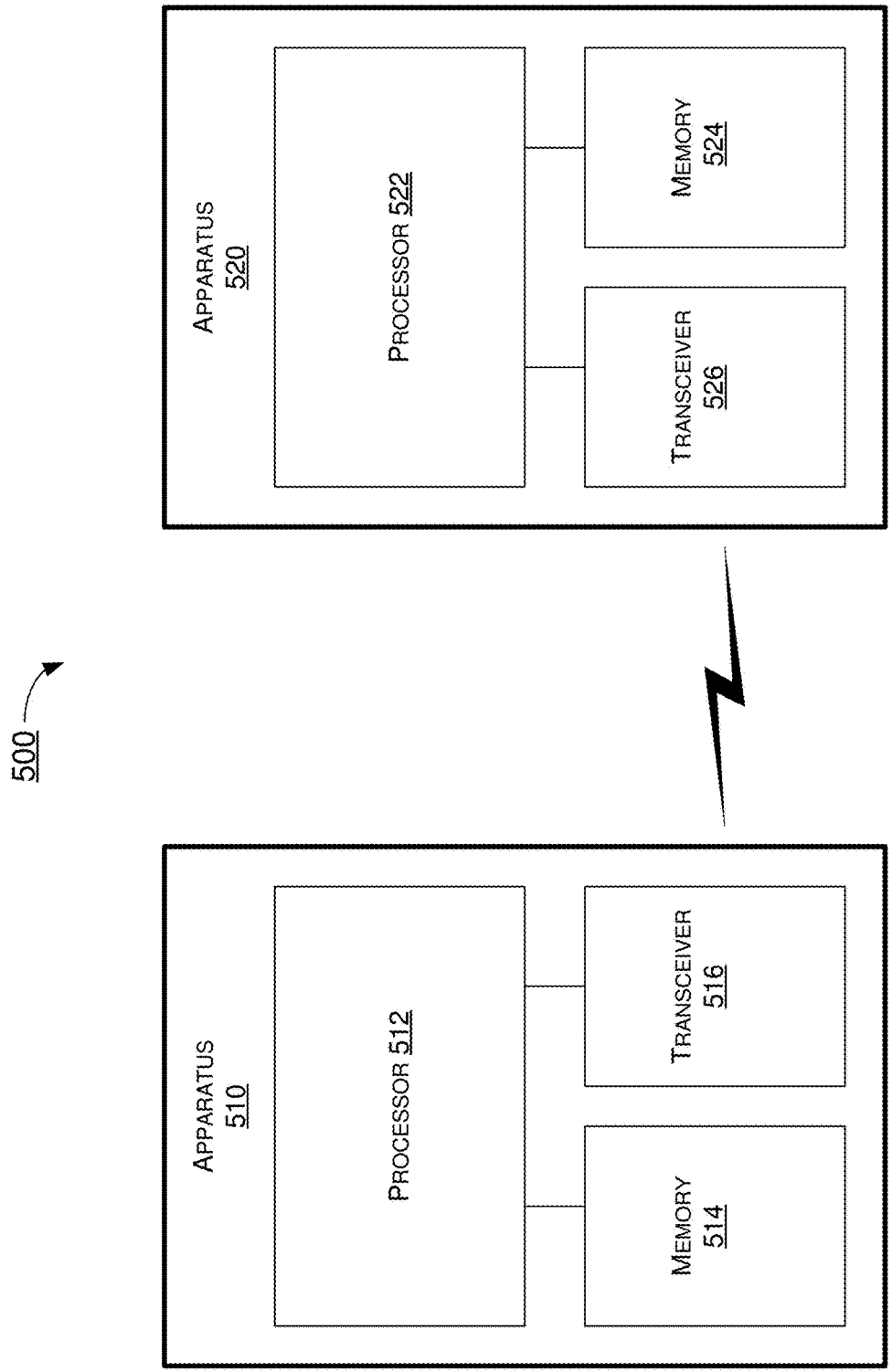
FIG. 5 is a diagram of an example wireless communication system in accordance with an implementation of the present disclosure.

FIG. 5 illustrates an example wireless communication system 500 in accordance with an implementation of the present disclosure. Wireless communication system 500 may involve an apparatus 510 and an apparatus 520 wirelessly connected to each other. Each of apparatus 510 and apparatus 520 may perform various functions to implement procedures, schemes, techniques, processes and methods described herein pertaining to resource allocation and VRB-to-PRB mapping in mobile communications, including the various procedures, scenarios, schemes, solutions, concepts and techniques described above as well as processes 600 and 700 described below.

Each of apparatus 510 and apparatus 520 may be a part of an electronic apparatus, which may be a UE such as a portable or mobile apparatus, a wearable apparatus, a wireless communication apparatus or a computing apparatus. For instance, each of apparatus 510 and apparatus 520 may be implemented in a smartphone, a smartwatch, a personal digital assistant, a digital camera, or a computing equipment such as a tablet computer, a laptop computer or a notebook computer. Moreover, each of apparatus 510 and apparatus 520 may also be a part of a machine type apparatus, which may be an IoT or NB-IoT apparatus such as an immobile or a stationary apparatus, a home apparatus, a wire communication apparatus or a computing apparatus. For instance, each of apparatus 510 and apparatus 520 may be implemented in a smart thermostat, a smart fridge, a smart door lock, a wireless speaker or a home control center. Alternatively, each of apparatus 510 and apparatus 520 may be implemented in the form of one or more integrated-circuit (IC) chips such as, for example and without limitation, one or more single-core processors, one or more multi-core processors, one or more reduced-instruction-set-computing (RISC) processors or one or more complex-instruction-set-computing (CISC) processors.

Each of apparatus 510 and apparatus 520 may include at least some of those components shown in FIG. 5 such as a processor 512 and a processor 522, respectively. Each of apparatus 510 and apparatus 520 may further include one or more other components not pertinent to the proposed scheme of the present disclosure (e.g., internal power supply, display device and/or user interface device), and, thus, such component(s) of each of apparatus 510 and apparatus 520 are neither shown in FIG. 5 nor described below in the interest of simplicity and brevity.

In one aspect, each of processor 512 and processor 522 may be implemented in the form of one or more single-core processors, one or more multi-core processors, one or more RISC processors, or one or more CISC processors. That is, even though a singular term "a processor" is used herein to refer to processor 512 and processor 522, each of processor 512 and processor 522 may include multiple processors in some implementations and a single processor in other implementations in accordance with the present disclosure. In another aspect, each of processor 512 and processor 522 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 512 and processor 522 is a special-purpose machine specifically designed, arranged and configured to perform specific tasks pertaining to resource allocation and VRB-to-PRB mapping in mobile communications in accordance with various implementations of the present disclosure. In some implementations, each of processor 512 and processor 522 may include an electronic circuit with hardware components implementing one or more of the various proposed schemes in accordance with the present disclosure. Alternatively, other than hardware components, each of processor 512 and processor 522 may also utilize software codes and/or instructions in addition to hardware components to implement resource allocation and VRB-to-PRB mapping in mobile communications in accordance with various implementations of the present disclosure.

In some implementations, apparatus 510 may also include a transceiver 516 coupled to processor 512 and capable of wirelessly transmitting and receiving data, signals and information. In some implementations, transceiver 516 may be equipped with a plurality of antenna ports (not shown) such as, for example, four antenna ports. That is, transceiver 516 may be equipped with multiple transmit antennas and multiple receive antennas for multiple-input multiple-output (MIMO) wireless communications. In some implementations, apparatus 510 may further include a memory 514 coupled to processor 512 and capable of being accessed by processor 512 and storing data therein. In some implementations, apparatus 520 may also include a transceiver 526 coupled to processor 522 and capable of wirelessly transmitting and receiving data, signals and information. In some implementations, transceiver 526 may be equipped with a plurality of antenna ports (not shown) such as, for example, four antenna ports. That is, transceiver 526 may be equipped with multiple transmit antennas and multiple receive antennas for MIMO wireless communications. In some implementations, apparatus 520 may further include a memory 524 coupled to processor 522 and capable of being accessed by processor 522 and storing data therein. Accordingly, apparatus 510 and apparatus 520 may wirelessly communicate with each other via transceiver 516 and transceiver 526, respectively.

To aid better understanding, the following description of the operations, functionalities and capabilities of each of apparatus 510 and apparatus 520 is provided in the context of a mobile communication environment in which apparatus 510 is implemented in or as a UE and apparatus 520 is implemented in or as a network node (e.g., gNB or TRP) of a wireless network (e.g., 5G/NR mobile network).

Under various proposed schemes in accordance with the present disclosure, processor 512 of apparatus 510 may receive, via transceiver 516, data from apparatus 520. The data may be represented by a plurality of resource block groups (RBGs) in a frequency domain in terms of resource allocation. Processor 512 may also process the data. In receiving the data, processor 512 may also be capable of receiving the data in one or more precoding resource block groups (PRGs) of a plurality of PRGs in the frequency domain via a MIMO wireless communication link established with apparatus 520 via transceiver 516. The plurality of RBGs and the plurality of PRGs may be aligned in the frequency domain.

In some implementations, the plurality of RBS and the plurality of PRGs may be defined with respect to a same reference point in the frequency domain.

In some implementations, a number of resource blocks in each RBG of the plurality of RBGs may depend on a BWP size, and RBG size may be one of the values in the set {1, 2, 4, 8, 16}. Additionally, a number of precoding resource blocks in each PRG of the plurality of PRGs may be one of the values in the set of {2, 4} or {2, 4, wideband}. Moreover, each RBG of the plurality of RBGs may correspond to one or more respective PRGs of the plurality of PRGs, and each PRG of the plurality of PRGs may correspond to one or more respective RBGs of the plurality of RBGs.

In some implementations, processor 512 may be further capable of performing other operations. For instance, processor 512 may receive, via transceiver 516, a control signaling from apparatus 520. Additionally, processor 512 may perform channel estimation on one or more frequency bands corresponding to one or more RBGs of the plurality of RBS. The control signaling may indicate that the one or more RBGs are allocated to the UE.

In some implementations, in receiving the data, processor 512 may be capable of performing a number of operations. For instance, processor 512 may receive the data represented by a plurality of resource blocks in the frequency domain in a downlink transmission from apparatus 520. Moreover, processor 512 may extract one or more resource blocks from the data according to the control signaling. In an event that interleaving is indicated in the control signaling, processor 512 may be capable of extracting the one or more resource blocks by de-interleaving the plurality of resource blocks to obtain the one or more resource blocks according to a VRB-to-PRB mapping scheme which is defined in terms of resource block bundles regardless of whether a number of PRBs in a carrier bandwidth part (BWP) for the downlink transmission is an integer multiple of a resource block bundle size of a plurality of resource block bundles in the VRB-to-PRB mapping scheme.

In some implementations, in extracting the one or more resource blocks, processor 512 may be further capable of, in an event that no interleaving is indicated in the control signaling, de-interleaving the plurality of resource blocks to obtain the one or more resource blocks according to a non-interleaved VRB-to-PRB mapping scheme in which a virtual resource block n is mapped to a physical resource block n.

In some implementations, in the event that the interleaving is indicated in the control signaling, the control signaling may also indicate a predefined resource block bundle size ($L_i$) such that the carrier BWP, index by i, is partitioned into the plurality of resource block bundles. In some implementations, each of the plurality of resource block bundles may include $L_i$ or less consecutive resource blocks.

In some implementations, a size of a first resource block bundle of the plurality of resource block bundles may be denoted by $Li-N_{BWP,i}^{start}$ mod Li. Here, $N_{BWP,i}^{size}$ may denote a size of the carrier BWP.

In some implementations, a last resource block of the plurality of resource block bundles may be denoted by:

$W=(N_{BWP,i}^{start}+N_{BWP,i}^{size})$ mod Li, responsive to W being non-zero, or $L_i$, response to W being zero.

In some implementations, in the VRB-to-PRB mapping scheme, each virtual resource block bundle j, except a last virtual resource block bundle, may be mapped to a corresponding physical resource block bundle f(j), where:

$f(j)=rC+c$ $j=cR+r, 0 \leq j \leq N$ $r=0,1,\ldots,R-1$ $c=0,1,\ldots,C-1$ $R=2$ $N=\lceil(N_{BWP,i}^{size}+N_{BWP,i}^{start} \mod Li)/Li\rceil-1$ $C=\lceil N/R \rceil$, Here, $N_{BWP,i}^{size}$ may denote a size of the carrier BWP, and the last virtual resource block bundle may be mapped to a last physical resource block bundle.

Illustrative Processes

Figure 6:
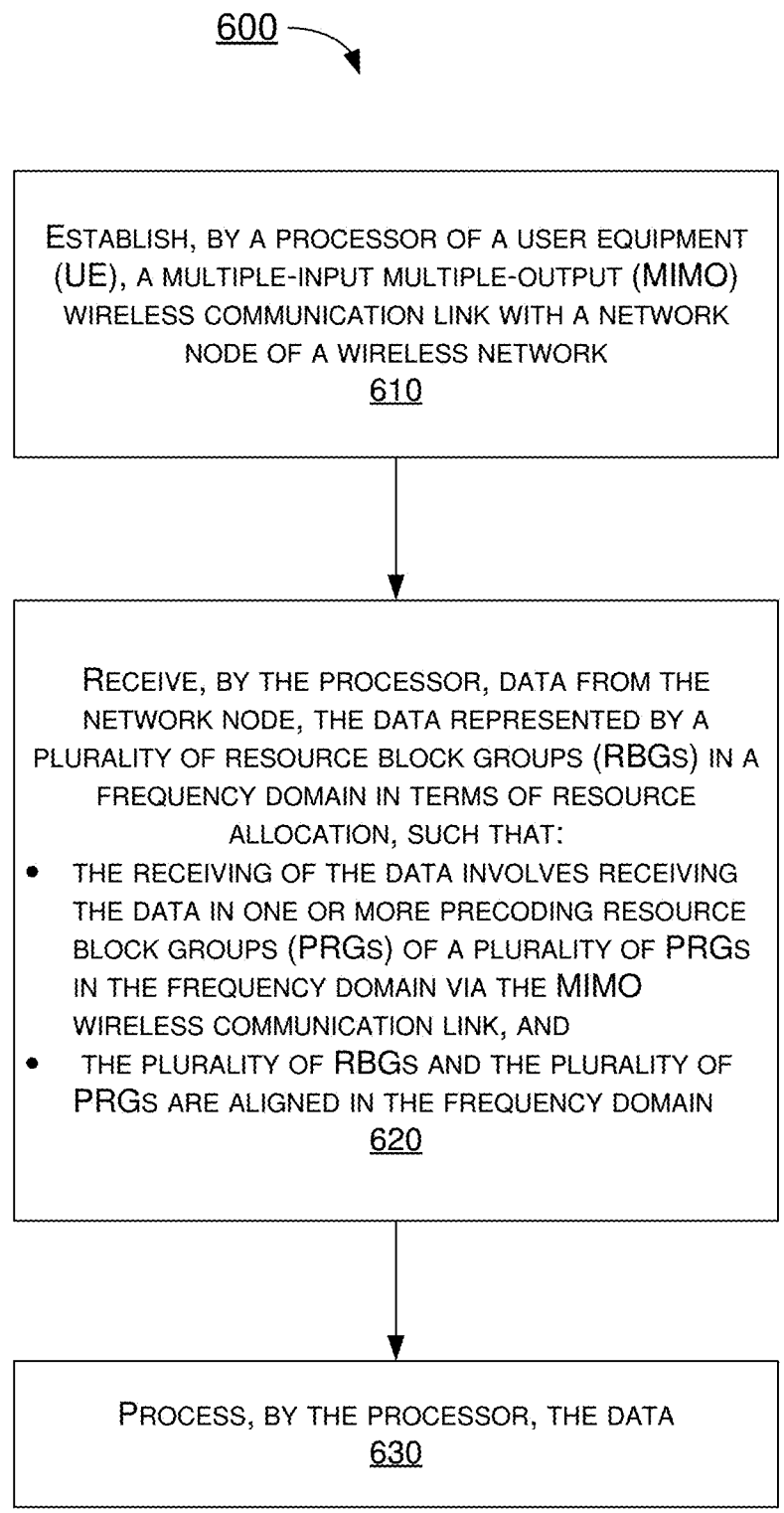
FIG. 6 is a flowchart of an example process in accordance with an implementation of the present disclosure.

FIG. 6 illustrates an example process 600 in accordance with an implementation of the present disclosure. Process 600 may be an example implementation of the various procedures, scenarios, schemes, solutions, concepts and techniques, or a combination thereof, whether partially or completely, with respect to resource allocation and VRB-to-PRB mapping in mobile communications in accordance with the present disclosure. Process 600 may represent an aspect of implementation of features of apparatus 510 and/or apparatus 520. Process 600 may include one or more operations, actions, or functions as illustrated by one or more of blocks 610, 620 and 630. Although illustrated as discrete blocks, various blocks of process 600 may be divided into additional blocks, combined into fewer blocks, or eliminated, depending on the desired implementation. Moreover, the blocks of process 600 may executed in the order shown in FIG. 6 or, alternatively, in a different order. Furthermore, one or more of the blocks of process 600 may be repeated one or more times. Process 600 may be implemented by apparatus 510 or any suitable UE or machine type devices. Solely for illustrative purposes and without limitation, process 600 is described below in the context of apparatus 510 as a UE and apparatus 520 as a network node (e.g., gNB or TRP) of a wireless network (e.g., 5G/NR mobile network). Process 600 may begin at block 610.

At 610, process 600 may involve processor 512 of apparatus 510 establishing, via transceiver 516, a multiple-input multiple-output (MIMO) wireless communication link with apparatus 520. Process 600 may proceed from 610 to 620.

At 620, process 600 may involve processor 512 receiving, via transceiver 516, data from apparatus 520. The data may be represented by a plurality of resource block groups (RBGs) in a frequency domain in terms of resource allocation. In receiving the data, process 600 may involve processor 512 receiving the data in one or more precoding resource block groups (PRGs) of a plurality of PRGs in the frequency domain via the MIMO wireless communication link. The plurality of RBGs and the plurality of PRGs may be aligned in the frequency domain. Process 600 may proceed from 620 to 630.

At 630, process 600 may involve processor 512 processing the data.

The method of claim 1, wherein the plurality of RBS and the plurality of PRGs are defined with respect to a same reference point in the frequency domain.

In some implementations, a number of resource blocks in each RBG of the plurality of RBGs may depend on a BWP size, and RBG size may be one of the values in the set {1, 2, 4, 8, 16}. Additionally, a number of precoding resource blocks in each PRG of the plurality of PRGs may be one of the values in the set of {2, 4} or {2, 4, wideband}. Moreover, each RBG of the plurality of RBGs may correspond to one or more respective PRGs of the plurality of PRGs, and each PRG of the plurality of PRGs may correspond to one or more respective RBGs of the plurality of RBGs.

In some implementations, process 600 may further involve processor 512 performing other operations. For instance, process 600 may involve processor 512 receiving, via transceiver 516, a control signaling from apparatus 520. Additionally, process 600 may further involve processor 512 performing channel estimation on one or more frequency bands corresponding to one or more RBGs of the plurality of RBS. The control signaling may indicate that the one or more RBGs are allocated to the UE.

Figure 7:
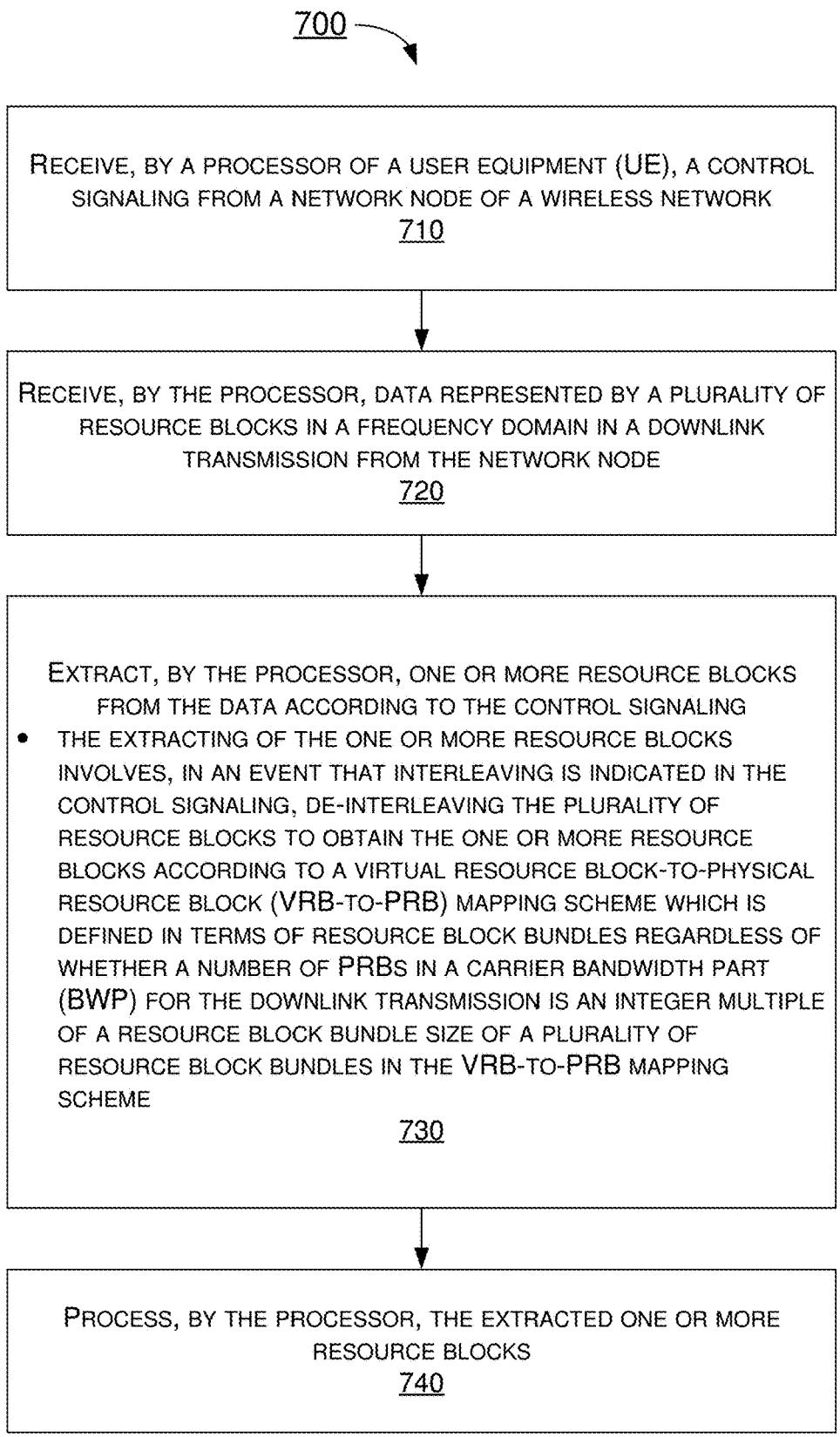
FIG. 7 is a flowchart of an example process in accordance with an implementation of the present disclosure.

FIG. 7 illustrates an example process 700 in accordance with an implementation of the present disclosure. Process 700 may be an example implementation of the various procedures, scenarios, schemes, solutions, concepts and techniques, or a combination thereof, whether partially or completely, with respect to resource allocation and VRB-to-PRB mapping in mobile communications in accordance with the present disclosure. Process 700 may represent an aspect of implementation of features of apparatus 510 and/or apparatus 520. Process 700 may include one or more operations, actions, or functions as illustrated by one or more of blocks 710, 720, 730 and 740. Although illustrated as discrete blocks, various blocks of process 700 may be divided into additional blocks, combined into fewer blocks, or eliminated, depending on the desired implementation. Moreover, the blocks of process 700 may executed in the order shown in FIG. 7 or, alternatively, in a different order. Furthermore, one or more of the blocks of process 700 may be repeated one or more times. Process 700 may be implemented by apparatus 510 or any suitable UE or machine type devices. Solely for illustrative purposes and without limitation, process 700 is described below in the context of apparatus 510 as a UE and apparatus 520 as a network node (e.g., gNB or TRP) of a wireless network (e.g., 5G/NR mobile network). Process 700 may begin at block 710.

At 710, process 700 may involve processor 512 of apparatus 510 receiving, via transceiver 516, a control signaling from apparatus 520. Process 700 may proceed from 710 to 720.

At 720, process 700 may involve processor 512 receiving, via transceiver 516, data represented by a plurality of resource blocks in a frequency domain in a downlink transmission from apparatus 520. Process 700 may proceed from 720 to 730.

At 730, process 700 may involve processor 512 extracting one or more resource blocks from the data according to the control signaling. In an event that interleaving is indicated in the control signaling, in extracting the one or more resource blocks, process 700 may involve processor 512 de-interleaving the plurality of resource blocks to obtain the one or more resource blocks according to a VRB-to-PRB mapping scheme which is defined in terms of resource block bundles regardless of whether a number of PRBs in a carrier BWP for the downlink transmission is an integer multiple of a resource block bundle size of a plurality of resource block bundles in the VRB-to-PRB mapping scheme. Process 700 may proceed from 730 to 740.

At 740, process 700 may involve processor 512 processing the extracted one or more resource blocks.

In some implementations, in extracting the one or more resource blocks in an event that no interleaving is indicated in the control signaling, process 700 may involve processor 512 de-interleaving the plurality of resource blocks to obtain the one or more resource blocks according to a non-interleaved VRB-to-PRB mapping scheme in which a virtual resource block n is mapped to a physical resource block n.

In some implementations, in the event that the interleaving is indicated in the control signaling, the control signaling may also indicate a predefined resource block bundle size ($L_i$) such that the carrier BWP, index by i, is partitioned into the plurality of resource block bundles. In some implementations, each of the plurality of resource block bundles may include $L_i$ or less consecutive resource blocks.

In some implementations, a size of a first resource block bundle of the plurality of resource block bundles may be denoted by $Li - N_{BWP,i}^{start} \mod Li$. Here, $N_{BWP,i}^{size}$ may denote a size of the carrier BWP.

In some implementations, a last resource block of the plurality of resource block bundles may be denoted by:

$W=(N_{BWP,i}^{start}+N_{BWP,i}^{size}) \mod Li$, responsive to W being non-zero, or Li, response to W being zero.

In some implementations, in the VRB-to-PRB mapping scheme, each virtual resource block bundle j, except a last virtual resource block bundle, may be mapped to a corresponding physical resource block bundle f(j), where:

$f(j)=rC+c$ $j=cR+r, 0 \leq j < N$ $r=0,1,\ldots,R-1$ $c=0,1,\ldots,C-1$ $R=2$ $N=\lceil (N_{BWP,i}^{size}+N_{BWP,i}^{start} \mod Li)/Li \rceil - 1$ $C=\lceil N/R \rceil$, Here, $N_{BWP,i}^{size}$ may denote a size of the carrier BWP, and the last virtual resource block bundle may be mapped to a last physical resource block bundle.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations.

Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   establishing, by a processor of a user equipment (UE), a multiple-input multiple-output (MIMO) wireless communication link with a network node of a wireless network;
   receiving, by the processor, a control signaling and data from the network node, the data represented by a plurality of resource block groups (RBGs) in a frequency domain in terms of resource allocation; and
   processing, by the processor, the data by extracting one or more resource blocks from the data according to the control signaling,
   wherein the receiving of the data comprises receiving the data in one or more precoding resource block groups (PRGs) of a plurality of PRGs in the frequency domain via the MIMO wireless communication link,
   wherein the plurality of RBGs and the plurality of PRGs are aligned in the frequency domain, and
   wherein, in an event that interleaving is indicated in the control signaling, the extracting comprises extracting the one or more resource blocks by de-interleaving the plurality of resource blocks to obtain the one or more resource blocks according to a virtual resource block-to-physical resource block (VRB-to-PRB) mapping scheme which is defined in terms of resource block bundles regardless of whether a number of PRBs in a carrier bandwidth part (BWP) for the downlink transmission is an integer multiple of a resource block bundle size of a plurality of resource block bundles in the VRB-to-PRB mapping scheme.

2. The method of claim 1, wherein the plurality of RBS and the plurality of PRGs are defined with respect to a same reference point in the frequency domain.

3. The method of claim 1, wherein a number of resource blocks in each RBG of the plurality of RBGs is dependent on a BWP size and is one of {1, 2, 4, 8, 16}, wherein a number of precoding resource blocks in each PRG of the plurality of PRGs is one of {2, 4}.

4. The method of claim 1, further comprising:
   performing, by the processor, channel estimation on one or more frequency bands corresponding to one or more PRGs of the plurality of PRGs,
   wherein the control signaling indicates that the one or more RBGs are allocated to the UE.

5. A method, comprising:
   receiving, by a processor of a user equipment (UE), a control signaling from a network node of a wireless network;
   receiving, by the processor, data represented by a plurality of resource blocks in a frequency domain in a downlink transmission from the network node;
   extracting, by the processor, one or more resource blocks from the data according to the control signaling; and
   processing, by the processor, the extracted one or more resource blocks,
   wherein the extracting of the one or more resource blocks comprises, in an event that interleaving is indicated in the control signaling, de-interleaving the plurality of resource blocks to obtain the one or more resource blocks according to a virtual resource block-to-physical resource block (VRB-to-PRB) mapping scheme which is defined in terms of resource block bundles regardless of whether a number of PRBs in a carrier bandwidth part (BWP) for the downlink transmission is an integer multiple of a resource block bundle size of a plurality of resource block bundles in the VRB-to-PRB mapping scheme.

6. The method of claim 5, wherein the extracting of the one or more resource blocks comprises, in an event that no interleaving is indicated in the control signaling, de-interleaving the plurality of resource blocks to obtain the one or more resource blocks according to a non-interleaved VRB-to-PRB mapping scheme in which a virtual resource block n is mapped to a physical resource block n.

7. The method of claim 5, wherein, in the event that the interleaving is indicated in the control signaling, the control signaling further indicates a predefined resource block bundle size ($L_i$) such that the carrier BWP, index by i, is partitioned into the plurality of resource block bundles, and wherein each of the plurality of resource block bundles comprises $L_i$ or less consecutive resource blocks.

8. The method of claim 7, wherein a size of a first resource block bundle of the plurality of resource block bundles is denoted by $L_i - N_{BWP,i}^{start}$ mod $L_i$, and wherein $N_{BWP,i}^{size}$ denotes a size of the carrier BWP.

9. The method of claim 8, wherein a last resource block of the plurality of resource block bundles is denoted by:
   $W = (N_{BWP,i}^{start} + N_{BWP,i}^{size})$ mod $L_i$, responsive to W being non-zero, or
   $L_i$, response to W being zero.

10. The method of claim 7, wherein, in the VRB-to-PRB mapping scheme, each virtual resource block bundle j, except a last virtual resource block bundle, is mapped to a corresponding physical resource block bundle f(j), wherein:

$$f(j) = rC + c$$

$$j = cR + r, \ 0 \le j < N$$

$$r = 0, 1, \ldots, R-1$$

$$c = 0, 1, \ldots, C-1$$

$$R = 2$$

$$N = \lceil (N_{BWP,i}^{size} + N_{BWP,i}^{start} \bmod L_i) \rceil - 1$$

$$C = \lceil N/R \rceil$$

wherein $N_{BWP,i}^{size}$ denotes a size of the carrier BWP, and wherein the last virtual resource block bundle is mapped to a last physical resource block bundle.

11. An apparatus implemented in a user equipment (UE), comprising:
- a transceiver capable of wirelessly communicating with a network node of a wireless network via a multiple-input multiple-output (MIMO) wireless communication link; and
- a processor coupled to the transceiver, the processor capable of:
  - receiving, via the transceiver, data from the network node, the data represented by a plurality of resource block groups (RBGs) in a frequency domain in terms of resource allocation;
  - receiving, via the transceiver, a control signaling from the network node; and
  - processing the data by extracting one or more resource blocks from the data according to the control signaling,
- wherein, in receiving the data, the processor is capable of receiving the data in one or more precoding resource block groups (PRGs) of a plurality of PRGs in the frequency domain via the MIMO wireless communication link,
- wherein the plurality of RBGs and the plurality of PRGs are aligned in the frequency domain, and
- wherein, in an event that interleaving is indicated in the control signaling, the processor is capable of extracting the one or more resource blocks by de-interleaving the plurality of resource blocks to obtain the one or more resource blocks according to a virtual resource block-to-physical resource block (VRB-to-PRB) mapping scheme which is defined in terms of resource block bundles regardless of whether a number of PRBs in a carrier bandwidth part (BWP) for the downlink transmission is an integer multiple of a resource block bundle size of a plurality of resource block bundles in the VRB-to-PRB mapping scheme.

12. The apparatus of claim 11, wherein the plurality of RBS and the plurality of PRGs are defined with respect to a same reference point in the frequency domain.

13. The apparatus of claim 11, wherein a number of resource blocks in each RBG of the plurality of RBGs is dependent on a bandwidth part (BWP) size and is one of {1, 2, 4, 8, 16}, wherein a number of precoding resource blocks in each PRG of the plurality of PRGs is one of {2, 4}.

14. The apparatus of claim 11, wherein the processor is further capable of:
- performing channel estimation on one or more frequency bands corresponding to one or more PRGs of the plurality of PRGs,
- wherein the control signaling indicates that the one or more RBGs are allocated to the UE.

15. The apparatus of claim 11, wherein, in receiving the data, the processor is further capable of:
- receiving the data represented by a plurality of resource blocks in the frequency domain in a downlink transmission from the network node.

16. The apparatus of claim 15, wherein, in extracting the one or more resource blocks, the processor is further capable of, in an event that no interleaving is indicated in the control signaling, de-interleaving the plurality of resource blocks to obtain the one or more resource blocks according to a non-interleaved VRB-to-PRB mapping scheme in which a virtual resource block n is mapped to a physical resource block n.

17. The apparatus of claim 15, wherein, in the event that the interleaving is indicated in the control signaling, the control signaling further indicates a predefined resource block bundle size ($L_i$) such that the carrier BWP, index by i, is partitioned into the plurality of resource block bundles, and wherein each of the plurality of resource block bundles comprises $L_i$ or less consecutive resource blocks.

18. The apparatus of claim 17, wherein a size of a first resource block bundle of the plurality of resource block bundles is denoted by $Li - N_{BWP,i}^{start} \mod Li$, and wherein $N_{BWP,i}^{size}$ denotes a size of the carrier BWP.

19. The apparatus of claim 18, wherein a last resource block of the plurality of resource block bundles is denoted by:

$W = (N_{BWP,i}^{start} + N_{BWP,i}^{size}) \mod Li$, responsive to W being non-zero, or $L_i$, response to W being zero.

20. The apparatus of claim 17, wherein, in the VRB-to-PRB mapping scheme, each virtual resource block bundle j, except a last virtual resource block bundle, is mapped to a corresponding physical resource block bundle f(j), wherein:

$f(j) = rC + c$ $j = cR + r,\ 0 \leq j < N$ $r = 0, 1, \ldots, R-1$ $c = 0, 1, \ldots, C-1$ $R = 2$ $N = \lceil (N_{BWP,i}^{size} + N_{BWP,i}^{start} \mod Li) \rceil - 1$ $C = \lceil N/R \rceil$ wherein $N_{BWP,i}^{size}$ denotes a size of the carrier BWP, and wherein the last virtual resource block bundle is mapped to a last physical resource block bundle.

* * * * *